(12) United States Patent
Ramaswamy et al.

(10) Patent No.: US 9,503,703 B1
(45) Date of Patent: Nov. 22, 2016

(54) APPROACHES FOR RECTIFYING STEREO CAMERAS

(71) Applicant: Amazon Technologies, Inc., Reno, NV (US)

(72) Inventors: Sharadh Ramaswamy, Sunnyvale, CA (US); David W. Stafford, Cupertino, CA (US); Volodymyr V. Ivanchenko, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 951 days.

(21) Appl. No.: 13/646,325

(22) Filed: Oct. 5, 2012

(51) Int. Cl.
*H04N 17/00* (2006.01)
*H04N 13/02* (2006.01)

(52) U.S. Cl.
CPC .................................. *H04N 13/0203* (2013.01)

(58) Field of Classification Search
CPC ............ H04N 19/00733; H04N 19/105; H04N 19/117; H04N 19/124; H04N 19/136; H04N 19/174; H04N 19/176; H04N 19/513; H04N 19/61; H04N 19/80; H04N 19/82; H04N 19/91; G06T 7/002
See application file for complete search history.

(56) References Cited

U.S. PATENT DOCUMENTS

| | | | | |
|---|---|---|---|---|
| 5,768,443 A | * | 6/1998 | Michael | G06T 7/002 382/151 |
| 6,768,509 B1 | * | 7/2004 | Bradski | G06K 9/48 348/187 |
| 2013/0208081 A1 | * | 8/2013 | Xiong | G06T 3/60 348/36 |

* cited by examiner

*Primary Examiner* — Mohammed Rahaman
(74) *Attorney, Agent, or Firm* — Polsinelli LLP

(57) ABSTRACT

The quality of stereoscopic imaging using cameras with wide angle lenses can be improved using various calibration approaches to determine distortions or misalignments between the cameras. A calibration object such as a checkered grid with a determined inclination between portions can be used to provide lateral calibration as well as depth information. Intersections of the checkered regions can be used to determine intersection points for the calibration object in the image. Lines formed by the checkered regions can be located, and the points correlated with these lines, in order to determine correspondence between points in the image. These points are mapped to corresponding points of the calibration object in the real world, to determine system parameters and/or image adjustments to be made when subsequent images are captured, in order to remove the distortions and misalignment when providing a stereo image based on images from the cameras.

18 Claims, 7 Drawing Sheets

APPROACHES FOR RECTIFYING STEREO CAMERAS

BACKGROUND

People are increasingly interacting with computers and other electronic devices in new and interesting ways. For example, mobile devices are increasingly offering multiple high quality cameras that enable additional types of functionality. In some devices, two of these high quality cameras can be used to provide three-dimensional (3D) image capture, for both still and video imaging. When using two distinct cameras, it is impossible to perfectly align the lens elements, such that a software adjustment is also required. Further, there will generally be distortions to images captured by each camera due to imperfect lenses and other elements that need to be accounted for to provide adequate imaging, particularly for wide angle lenses. Conventional approaches to aligning camera elements and removing distortions prove inadequate for wide angle lenses used with stereo imaging.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to capturing image information using an electronic device. In particular, various embodiments enable the capture of three-dimensional (3D) or stereoscopic image data using a pair of cameras or camera sensors positioned on a computing device. Approaches enable the cameras to be aligned through software mechanisms, as well as via mechanical alignment, in order to enable the captured stereo images to include a proper amount of disparity or depth information, as well as to have objects aligned in images captured by each camera. Various calibration processes are presented that enable any misalignment between the cameras to be determined, which can then be addressed when processing images captured by those cameras. The calibration process also can be used to remove various lens distortions or other effects of the elements of each camera by determining the amount of distortion and then processing the captured images to remove the distortion.

Various other applications, processes, and uses are presented below with respect to the various embodiments.

Figure 1:
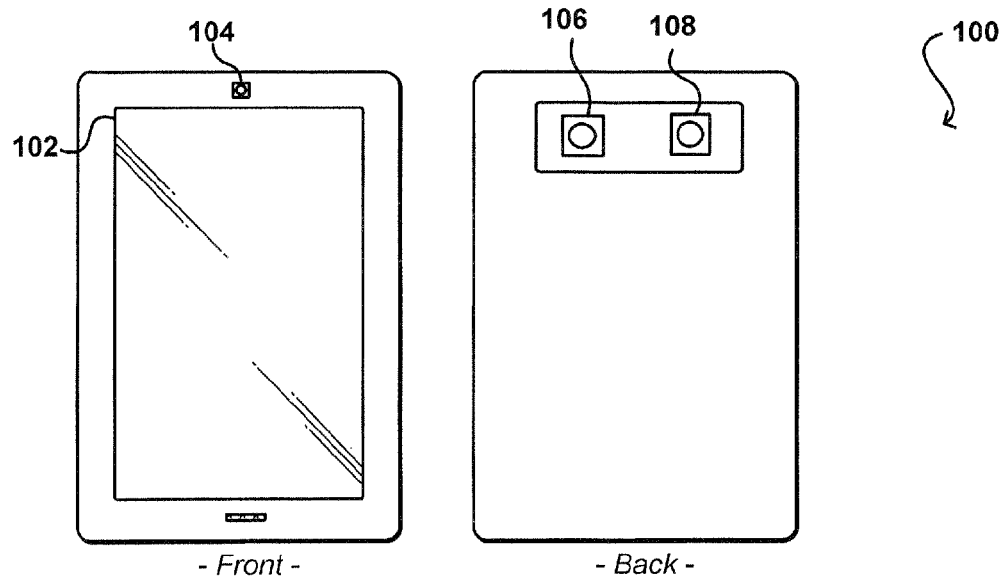
FIG. 1 illustrates front and back views of an example computing device including a pair of cameras for 3D imaging that can be utilized in accordance with various embodiments.

Many electronic and computing devices offer stereoscopic or three-dimensional (3D) imaging using at least one pair of high resolution matched cameras. For example, FIG. 1 illustrates front and back views of an example electronic device 100 wherein a front of the device includes a display screen 102 and other input elements, such as a front-facing camera 104 for video chat or other such purposes. The display can be, for example, a glasses-free 3D capable display, a display capable of presenting glasses-assisted 3D image information, or a conventional 2D display, among other such options. The device also includes a pair of matched cameras 106, 108 on a back side of the device. It should be understood that terms such as "front" and "back" are used for purposes of explanation and are not intended to require absolute orientations unless otherwise stated. These cameras 106, 108 are separated a distance sufficient to enable stereoscopic imaging over at least a determined distance, each with a determined field of view that at least partially overlaps. The stereo cameras typically are relatively high resolution cameras (e.g., 5.0 MP or above for conventional devices), such as CMOS or CCD cameras, among other such options. In some embodiments the stereo cameras each come with auto-focusing mechanisms, enabling the cameras to focus to different depths. As mentioned, the cameras can each include at least one wide-angle lens, such as a lens providing a field of view of at least sixty degrees, ninety degrees, or one-hundred and twenty degrees, among other such options.

Figure 2:
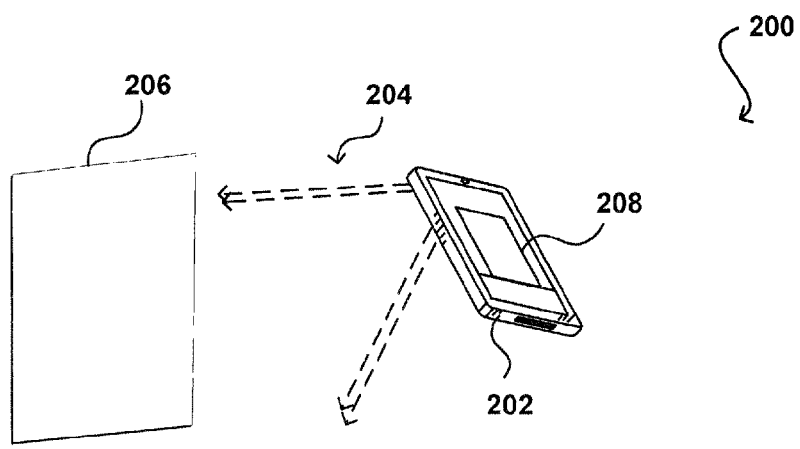
FIG. 2 illustrates an example of a computer capturing an image of an object in accordance with various embodiments.

When capturing a stereoscopic ("stereo") image, each of the pair of cameras captures an image at approximately the same time. The offset of the cameras will cause the location of objects in each image to be slightly offset, where the amount of offset is a factor of the separation of the cameras and the distance from the cameras to the objects. This varying offset with distance, otherwise known as disparity, provides the perception of depth in the image when the images are combined using a stereovision process. As illustrated in the example situation 200 of FIG. 2, a portable computing device 202 with a pair of stereo cameras on the back can be pointed at an object 206 such that the object is within the field of view 204 of the cameras. Since a display screen 208 is on the opposite side of the device 202, a user holding the device can view the stereo image being captured, assuming the display is capable of rendering the stereo information for a two- or three-dimensional display. The user thus can view a three-dimensional view of the object 206 as captured by the cameras and displayed on the display screen 208. It should be understood that a stereo image can be a combined image or can include a rendering of separate images captured by each of the stereo cameras in different embodiments.

In order for the image of the object 206 to have the desired appearance in the captured stereo image, the cameras have to be aligned such that the object is properly positioned in each image to provide the desired depth information. Further, the images captured by each camera need to be relatively free of lens distortion or other artifacts that would cause the shape of the object to differ in the images captured by each camera.

Figure 3A:
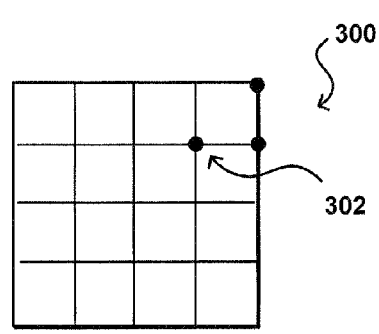
FIGS. 3(a), 3(b), 3(c), 3(d), and 3(e) illustrate examples of images of a calibration object that can be captured and/or processed in accordance with various embodiments.

As mentioned, the cameras can be aligned mechanically to the extent possible and/or practical. There still can be at least some misalignment, however, such that it can be desirable to compensate for the misalignment through software and/or image processing. An approach in accordance with various embodiments can use a calibration object 300, such as the calibration grid illustrated in FIG. 3(a), to enable points to be located in an image captured by each camera. The relative location of these points in each image then can be correlated to generate a mapping, or at least an offset, by which points in at least one image should be translated or adjusted in order to compensate for any misalignment. For example, each point 302 on a grid can be located in an image captured by each camera, and an offset or function determined for matching these locations in the image, with respect to the expected amount of disparity between the images for the location of the calibration object. In some embodiments, an overall adjustment such as an amount of translation and/or rotation can be determined that should be applied to an image captured by at least one of the cameras. For example, if one of the cameras is determined to be angled at 0.5 degrees with respect to the other camera, images captured by one of the cameras can be rotated by 0.5 degrees to align the images. Similarly, if there is a determined translation or offset in terms of pixel values, distances, etc., at least one of the images can be shifted to compensate for the offset.

Figure 3B:
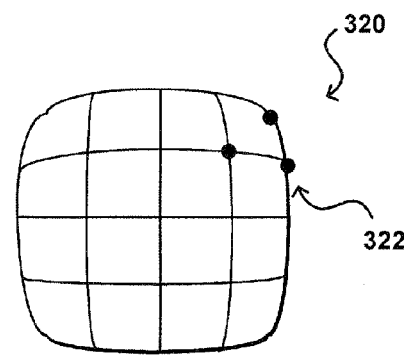

A potential problem with such an approach, however, is that lenses, particularly wide-angle lenses, can have irregularities and/or aspects that cause distortions to be present in images captured by cameras associated with those lenses. For example, FIG. 3(b) illustrates an example image 320 of a grid, or "calibration rig," that can be captured using one of the cameras with a wide angle lens. As can be seen, there can be an amount of distortion that can increase towards the edge of the lens, which can cause straight lines to appear to be bent or curved. While points can be identified as the intersection of lines or squares in the grid, for example, the distortion can make it difficult to correlate points that are next to each other in the image coordinate system, with respect to the calibration coordinate system. For the three points shown in FIG. 3(b) it might be difficult for an algorithm to determine which of these points are actually nearest neighbors, are along the same line in the grid, or are otherwise associated. The correlation is further complicated when the distortion is different for each camera, such that points in an image not only have to be correlated to the actual points that were imaged, but also the corresponding points in the image captured by the other camera.

Figure 3C:
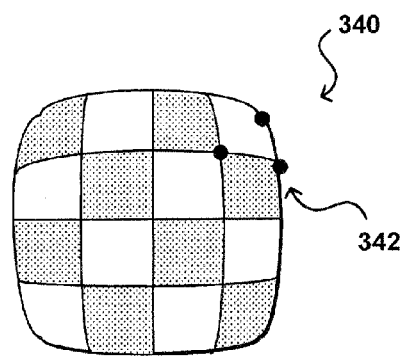

Accordingly, an approach in accordance with various embodiments uses a chessboard or checkerboard style calibration object. FIG. 3(c) illustrates an example image 340 that can be captured of the checkerboard image using the same lens as was used to capture the grid object in FIG. 3(b). As illustrated, the distortion still causes the points 322 to be located in positions that can be difficult to correlate. As illustrated in FIG. 3(c), however, different regions of the calibration object have different colors or intensities, such as may include black and white alternating squares or other such features. The edges formed between these squares can be used to correlate points in the image. For example, in FIG. 3(c) it can be seen that two of the points 342 are along an edge with white or high intensity values along the upper edge and black or low intensity values along the bottom edge. Since these points can be determined to lie upon a common edge, these points can be correlated with locations in the actual grid and determined to lie along the same horizontal line. The alternating intensities can also be used to quickly identify the location of intersection points in the images, which then can be correlated to corresponding locations on the calibration object. By determining connected points for the grid in each image, the amount of shift for each point can be determined and an appropriate adjustment determined for each point location for each camera. Such an approach enables the images captured by both cameras to be rectified and lens distortion effects minimized.

Figure 3D:
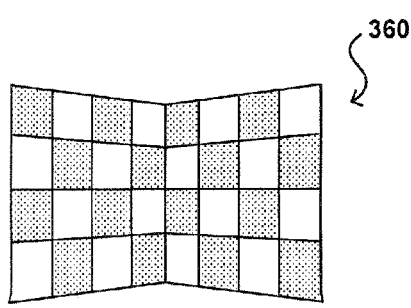
Figure 3E:
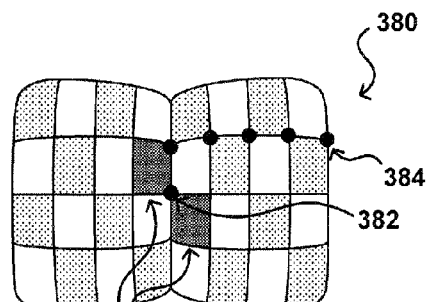

In some cases, however, it can be desirable to obtain depth information as well, as distortions and/or misalignments can potentially vary with depth or distance as well. Accordingly, approaches in accordance with various embodiments can utilize a three-dimensional calibration object to also obtain depth information. FIG. 3(d) illustrates an example of such a calibration object 360, wherein a checkerboard pattern is essentially folded about a vertical axis. In this example the folded portions of the object are at a ninety degree angle with respect to each other, although various other angles can be utilized as well within the scope of the various embodiments. The object can be positioned with the vertical axis as the furthest point from the camera, such that the object faces the stereo cameras like an open book to a reader. FIG. 3(e) illustrates an example image 380 that can be captured of such an object using one of the stereo cameras with a wide angle lens. As discussed, previously, the intensity, color, or pixel variations between features of the calibration object can be used to locate points of the grid and determine corresponding points. In this example, two of the features 386 have a different color or intensity value, such that a point 382 at the intersection of those features can be defined in each image and correlated to a point in the calibration object. The points 384 located from the intersections of the calibration object then can be correlated with respect to each other and have locations calculated and/or stored with respect to the reference point 382, which facilitates correlation among the pair of images for the two cameras as well. As discussed, the variations in the points can be used to remove distortions and/or misalignments through processing the captured images and reversing or otherwise accounting for the individual offsets. In at least some embodiments, a model can be generated for each camera and/or lens that can be used to remove alignment or distortion artifacts from images captured using the camera and/or lens.

Figure 4:
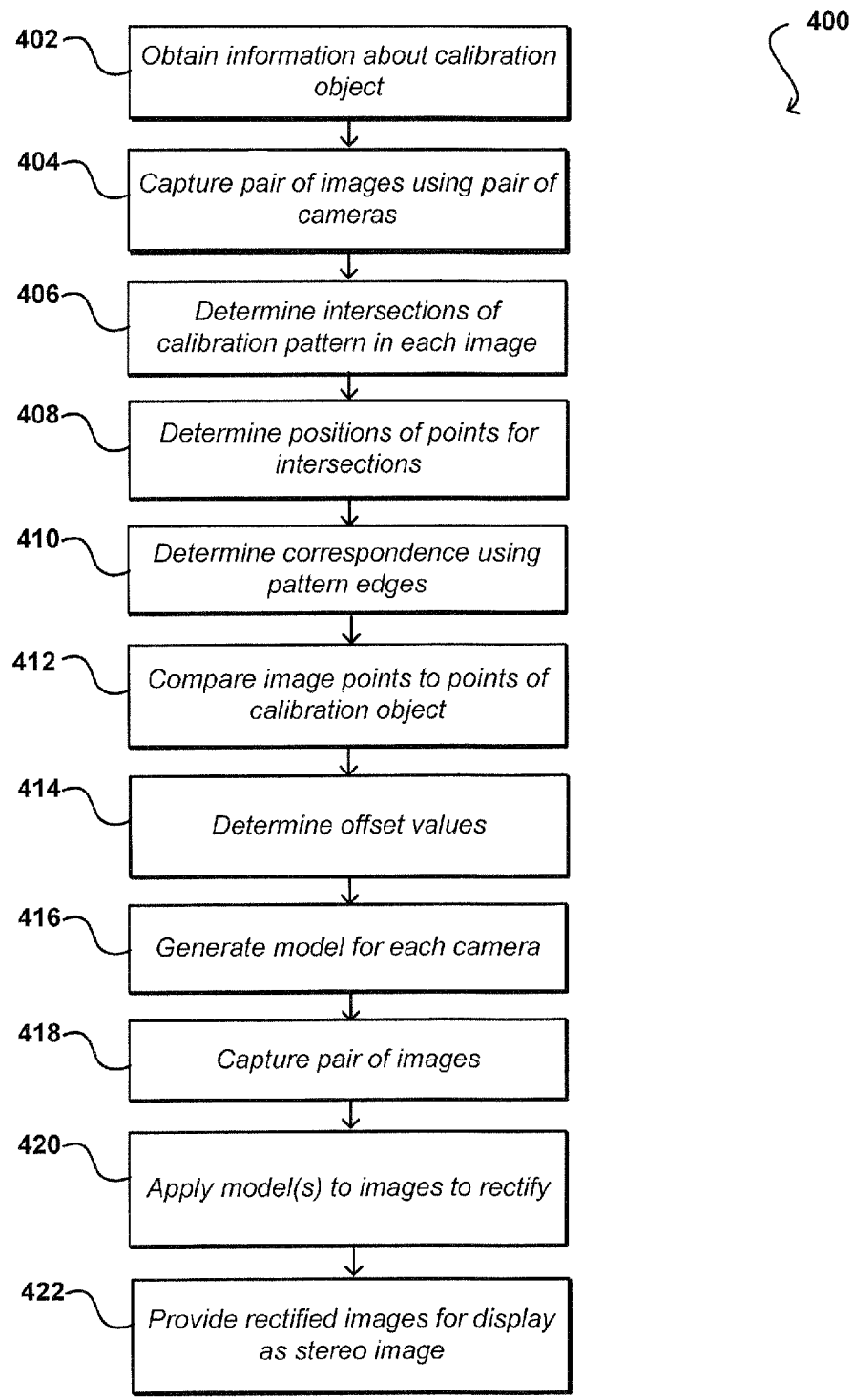
FIG. 4 illustrates an example process for aligning stereo cameras and removing lens distortions that can be utilized in accordance with various embodiments.

FIG. 4 illustrates an example process 400 for rectifying or otherwise accounting for variations in images captured by a pair of stereo cameras that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, information about a coordinate system corresponding to a calibration object is obtained 402. As discussed, the calibration object can correspond to a flat or folded checkerboard-style object, and the coordinate system can correspond to how an image of that calibration object should appear to a camera capturing an image of that object. A pair of images of the calibration object can be captured 404 using a pair of cameras, or a stereoscopic camera, on a computing device. For each image, the intersections of the colored features or regions of the pattern can be determined 406 and points for those intersections determined 408 as calibration points. The edges of the calibration pattern can be used to correlate 410 the calibration points, such as to determine which points fall along vertical and/or horizontal lines. In at least some embodiments, the points along vertical lines can first be determined, then the points can be correlated with horizontal lines in the calibration pattern. Once the points are correlated, the points can be compared 412 to the location of those points in the reference or calibration coordinate system. Offset values for the points can be determined 414, and in at least some embodiments a model (e.g., a "rectifying model") of the camera(s) capturing that image can be generated 416. As mentioned, the rectifying model can include transforms or adjustments to be made to an image captured by one or both of the cameras in order to reduce misalignment and/or distortion effects. Once a subsequent stereoscopic image is captured 418 using the pair of cameras, the model can be applied 420 to each image to remove distortion and misalignment effects from each image before providing 422 the stereoscopic image for display.

Figure 5A:
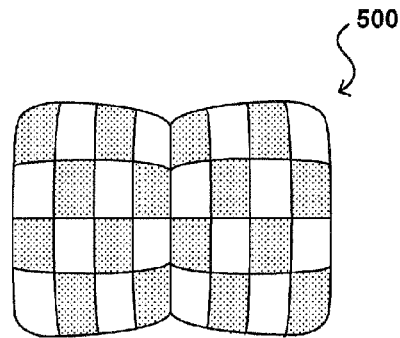
FIGS. 5(a), 5(b), 5(c), 5(d), 5(e), and 5(f) illustrate examples of images of a calibration object that can be captured and/or processed in accordance with various embodiments.
Figure 5B:
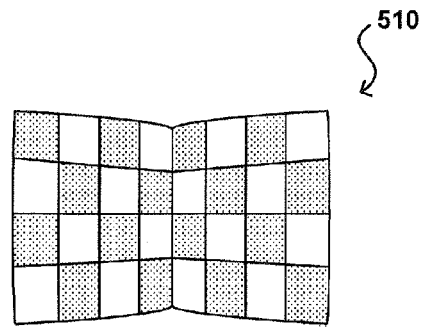

In some embodiments, more accurate correspondences can be determined by first attempting to remove at least some of the nonlinearities from the images before attempting to locate and correlate the points. For example, FIG. 5(a) illustrates an example image 500 that can be captured by one of the cameras, showing a view of a folded calibration object. As can be seen, there is some distortion in the image. Since the type of lens used with the camera is known, a default map can be generated that includes adjustments for the typical amount of distortion present for a lens of that type. The map can be received from a manufacturer of the lens or camera, generated by capturing and analyzing images using multiple lenses, or otherwise obtained. When an image is subsequently captured by one of the cameras, the default model can be applied before analyzing the image, in order to attempt to remove a significant portion of the nonlinearities and/or distortions. As an example, FIG. 5(b) illustrates an example 510 of the image of FIG. 5(a) after processing with the default model. As illustrated, a significant portion of the distortion has been removed, where that distortion is primarily due to the type of lens. Due to variations between lenses, mounting differences, and other aspects, however, at least some distortion, skew, perspective, and/or projective transformations can still be present in the image.

Figure 5C:
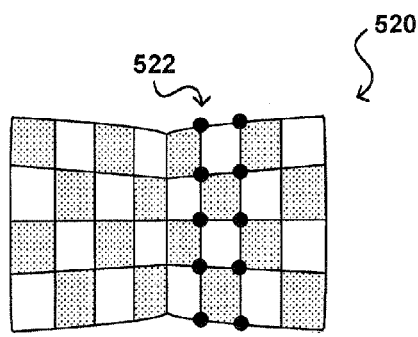

After a significant portion of the lens distortions have been removed, the image captured of the calibration object by each of the cameras will appear to have relatively straight lines, which then can be extracted from the image through an image processing transform, such as a Hough transform. A Hough transform, as known in the art, can be used to extract features from an image through a "voting" process for candidate features in the image. FIG. 5(c) illustrates an example 520 where a portion of the points 522 have been identified via the image processing transform. In at least some embodiments, the corners or intersections of the calibration object can also be extracted by a corner detection algorithm, such as a Harris corners detection algorithm. An advantage to using corners or intersections is that the presence of ghost points due to noise can be significantly reduced with respect to conventional feature detection algorithms. The lines of the calibration object can be used to group corners in the left and right images, and the grouped corners can be used for reconstruction of the calibration object.

Figure 5D:
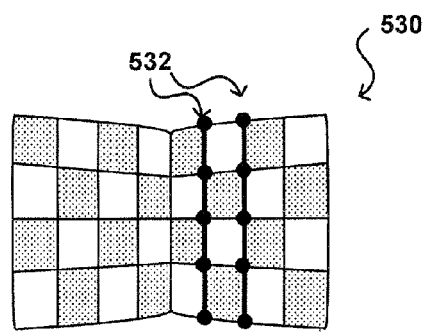
Figure 5E:
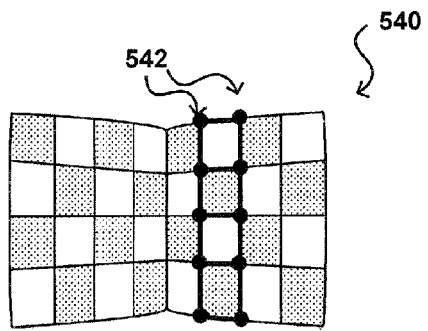
Figure 5F:
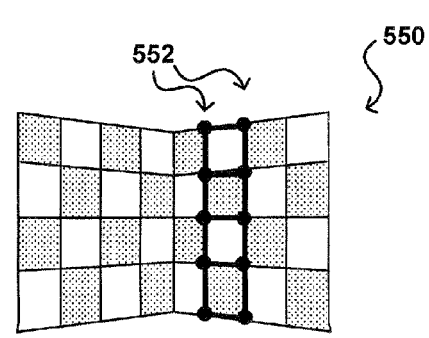

In at least some embodiments, it can be relatively easy to detect or identify vertical lines in the image, such as the lines 532 identified in FIG. 5(d). The lines can be identified through any of a number of image processing techniques. Once the vertical lines are located, the locations of acquired points can be determined and associated with one of the vertical lines, so the set of points will each then be associated with one of the vertical lines of the calibration grid. Once the points are associated with one of the vertical lines, the relationships 542 to points along adjacent vertical lines can be determined, as illustrated in FIG. 5(e). In some embodiments, neighbors can be identified using the edges connecting them, as discussed above. These points then can be mapped to corresponding points 552 of the calibration coordinate system, as illustrated in FIG. 5(f). Based at least in part upon the mappings, the appropriate system parameters can be determined that can be used to correct for the camera distortions, as well as to align the pair of cameras (e.g., the left and right stereo cameras).

Figure 6:
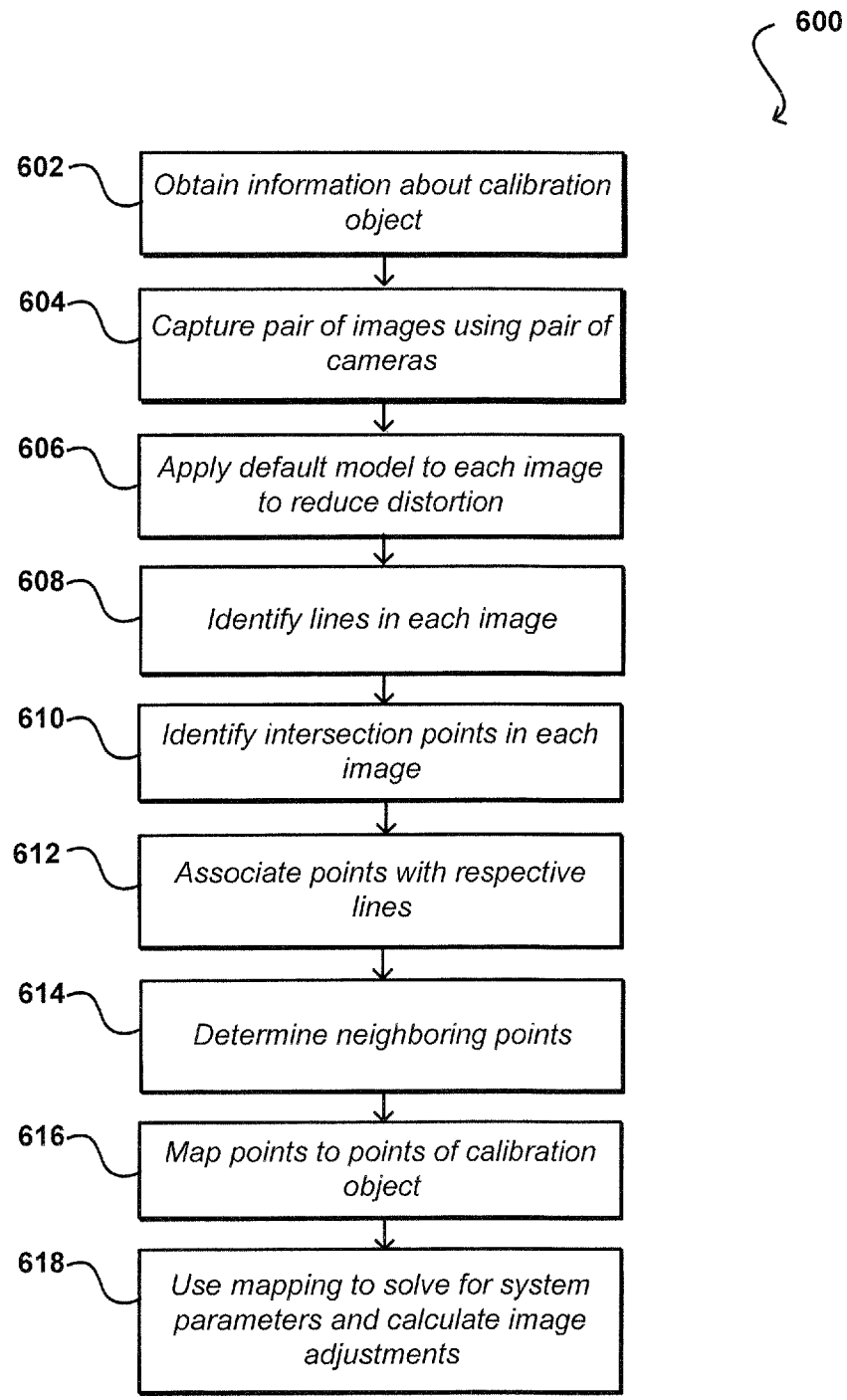
FIG. 6 illustrates an example process for aligning stereo cameras and removing lens distortions that can be utilized in accordance with various embodiments.

FIG. 6 illustrates a second example process 600 for rectifying or otherwise accounting for variations in images captured by a pair of stereo cameras that can be utilized in accordance with various embodiments. In this example, information about a coordinate system corresponding to a calibration object is obtained 602. As discussed, the calibration object can correspond to a flat or folded checkerboard-style object. A pair of images of the calibration object can be captured 604 using a pair of cameras on a computing device. For each image, a default model can be applied 606 to remove a significant portion of the distortions in the image due to the optics and/or other elements of the type of camera. Once the lines of the calibration object are relatively straight in the image, the lines can be identified 608 using an image processing transform, and intersection points of the calibration object can be identified 610 using a corners detection algorithm, or other such approach. Each of the intersection points can be associated 612 with one of the lines, and neighboring points determined 614 using the edges connecting those points on adjacent lines. In some embodiments, the points can be connected iteratively by progressing across each individual vertical line and examining corresponding edges. Once the correspondence of the points in the image is determined, the image points can be mapped 616 to the points of the calibration object in the real world. The mapping then can be used to solve 618 for the system parameters and calculate image adjustments, which can be used to effectively align the cameras and remove distortions from subsequently captured images.

There are many approaches known and/or used for combining stereo images as mentioned previously, such that the merging or combining will not be discussed herein in detail. Generally, displacements for similar features are determined between the two images to be merged and a depth is assigned based at least in part upon the lateral difference in location in the image information (as closer objects with have a greater lateral displacement in the captured image information). Several different approaches can assist with the depth mapping, including color mapping, grayscale mapping, texture mapping, and edge mapping, among others.

Figure 7:
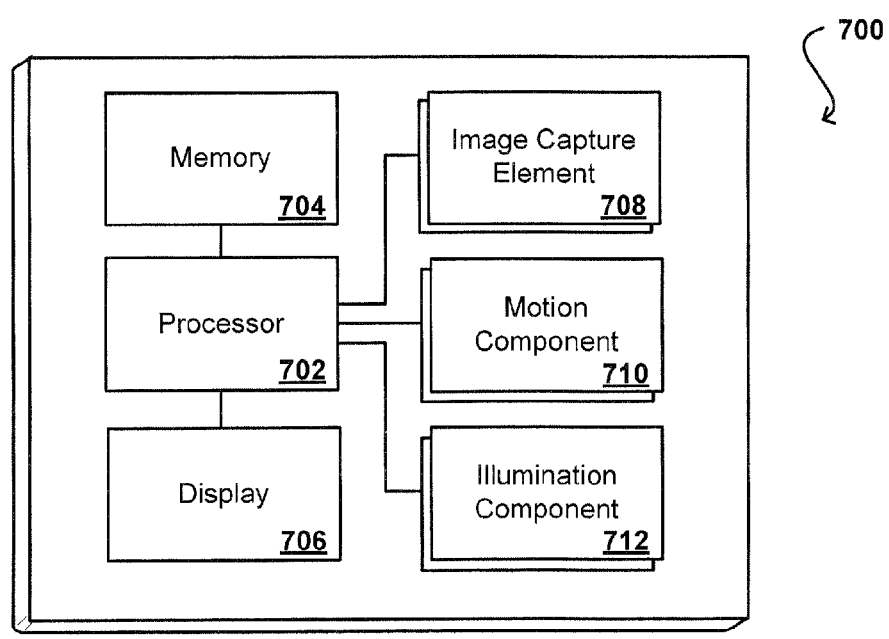
FIG. 7 illustrates an example configuration of components of a computing device such as that illustrated in FIG. 1.

FIG. 7 illustrates an example set of basic components of a computing device 700, such as the device 100 described with respect to FIG. 1. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one dedicated gesture component, such as an IR sensor or detector, operable to capture information for use in determining gestures or motions of the user, which will enable the user to provide input through the portable device without having to actually contact and/or move the portable device. The device can include at least one motion component 710, such as an accelerometer or inertial sensor to measure translation, an electronic compass to calibrate direction in up to three dimensions, an electronic gyroscope to determine and/or track changes in orientation, and other such elements. Motion determining elements can help in determining movement and using the determined movement to correct image information. The device also can include at least one illumination element 712, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
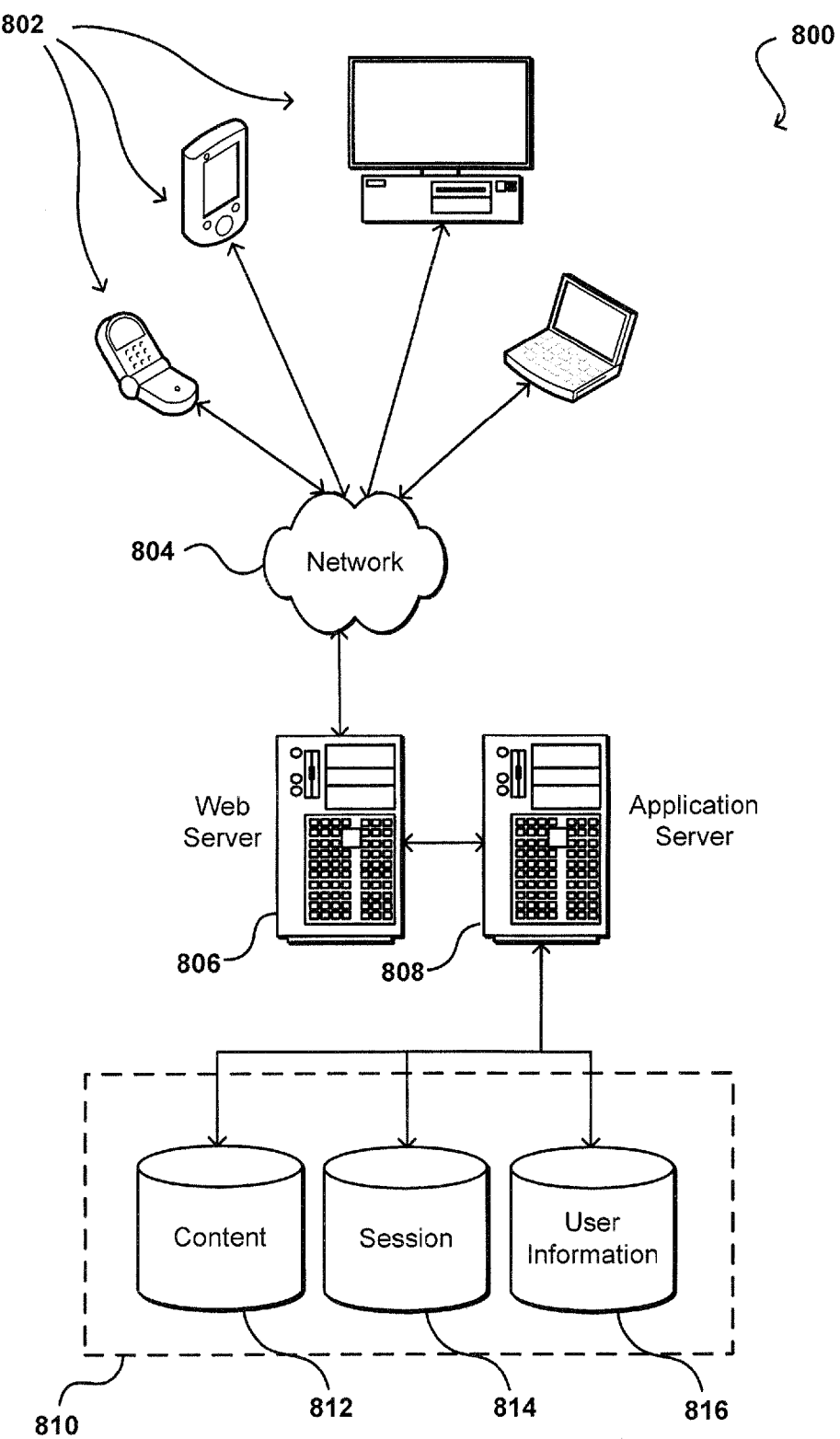
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining a first image including a first representation of a calibration object using a first camera, the calibration object including a first portion of alternating regions of a first intensity and one of a second intensity or a third intensity joined along a vertical axis at a specified angle with respect to a second portion of alternating regions of the first intensity and one of the second intensity or the third intensity, the first portion including one first region of the third intensity that intersects with one second region of the third intensity included in the second portion;

obtaining a second image including a second representation of the calibration object using a second camera separated a distance from the first camera;

locating a first reference point in the first image at which the first region and the second region intersect;

locating a second reference point in the second image at which the first region and the second region intersect;

locating first points, relative to the first reference point, in the first image corresponding to intersections of at least one of the first portion of alternating regions or the second portion of alternating regions;

locating second points, relative to the second reference point, in the second image corresponding to the intersections;

determining correlated points by correlating the first points to the second points using edges formed between at least one of the first portion of alternating regions or the second portion of alternating regions;

determining a mapping of the correlated points to corresponding points of the calibration object; and storing the mapping for reducing at least one of misalignment or distortion effects from subsequent pairs of images captured by the first camera and the second camera, each subsequent pair of images capable of being used to generate a stereoscopic image.

2. The computer-implemented method of claim 1, further comprising:

applying a default model, to each of the first image and the second image to remove distortion due to a type of the first camera and the second camera, before performing the locating.

3. The computer-implemented method of claim 1, wherein locating the first points, relative to the first reference point, in the first image is performed using a corners detection algorithm.

4. The computer-implemented method of claim 1, further comprising:

locating vertical lines of at least one of the first portion of alternating regions or the second portion of alternating regions in each of the first image and the second image; and associating each of the first points and the second points with one of the vertical lines.

5. The computer-implemented method of claim 4, wherein locating the vertical lines is performed using an image processing transform.

6. The computer-implemented method of claim 1, wherein at least one of the first portion of the alternating regions or the second portion of alternating regions is a regular checker pattern.

7. The computer-implemented method of claim 1, wherein each of the first camera and the second camera includes a respective wide-angle lens having a respective field of view of at least one-hundred and twenty degrees.

8. A computing device, comprising:
at least one device processor;
a first camera having a first field of view;
a second camera separated a distance on the computing device from the first camera, the second camera having a second field of view that at least partially overlaps the first field of view; and a memory device including instructions that, when executed by the at least one device processor, causes the computing device to:

obtain a first image including a first representation e of a calibration object using the first camera, the calibration object including a first portion of alternating regions of a first intensity and one of a second intensity or a third intensity joined along a vertical axis at a specified angle with respect to a second portion of alternating regions of the first intensity and one of the second intensity or the third intensity, the first portion including one first region of the third intensity that intersects with one second region of the third intensity included in the second portion;

obtain a second image including a second representation of the calibration object using the second camera;

locate a first reference point in the first image at which the first region and the second region intersect;

locate a second reference point in the second image at which the first region and the second region intersect;

locate first points, relative to the first reference point, in the first image corresponding to intersections of at least one of the first portion of alternating regions or the second portion of alternating regions;

locate second points, relative to the second reference point, in the second image corresponding to the intersections;

determine correlated points by correlating the first points to the second points using edges formed between at least one of the first portion of alternating regions or the second portion of alternating regions;

determine a mapping of the correlated points to corresponding points of the calibration object; and store the mapping for reducing at least one of misalignment or distortion effects from subsequent pairs of images captured by the first camera and the second camera, each subsequent pair of images capable of being used to generate a stereoscopic image.

9. The computing device of claim 8, wherein the instructions when executed further cause the computing device to:

apply a default model to each of the first image and the second image to remove distortion due to a type of the first camera and the second camera.

10. The computing device of claim 8, wherein the instructions when executed further cause the computing device to:

locate vertical lines of at least one of the first portion of alternating regions or the second portion of alternating regions in each of the first image and the second image; and associate each of the first points and the second points with one of the vertical lines.

11. The computing device of claim 8, wherein each of the first camera and the second camera includes a respective wide-angle lens having a respective field of view of at least one hundred and twenty degrees.

12. The computing device of claim 8, wherein at least one of the first portion of the alternating regions or the second portion of alternating regions is a regular checker pattern.

13. A non-transitory computer-readable storage medium storing instructions that, when executed by at least one processor of a computing device, cause the computing device to:

obtain a first image including a first representation of a calibration object using a first camera, the calibration object including a first portion of alternating regions of a first intensity and one of a second intensity or a third intensity joined along a vertical axis at a specified angle with respect to a second portion of alternating regions;

obtain a second image including a second representation of the calibration object using a second camera separated a distance from the first camera of the first intensity and one of the second intensity or the third intensity, the first portion including one first region of the third intensity that intersects with one second region of the third intensity included in the second portion;

locate a first reference point in the first image at which the first region and the second region intersect;

locate a second reference point in the second image at which the first region and the second region intersect;

locate first points, relative to the first reference point, in the first image corresponding to intersections of at least one of the first portion of alternating regions or the second portion of alternating regions;

locate second points, relative to the first reference point, in the second image corresponding to the intersections;

determining correlated points by correlating the first points to the second points using edges formed between at least one of the first portion of alternating regions or the second portion of alternating regions;

determine a mapping of the correlated points to corresponding points of the calibration object; and store the mapping for reducing at least one of misalignment or distortion effects from subsequent pairs of images captured by the first camera and the second camera, each subsequent pair of images capable of being used to generate a stereoscopic image display.

14. The non-transitory computer-readable storage medium of claim 13, wherein the instructions when executed further cause the computing device to:

apply a default model to each of the first image and the second image to remove distortion due to a type of the first camera and the second camera.

15. The non-transitory computer-readable storage medium of claim 13, wherein the instructions when executed further cause the computing device to:

locate vertical lines of at least one of the first portion alternating regions or the second portion alternating regions in each of the first image and the second image; and associate each of the first points and the second points with one of the vertical lines.

16. The non-transitory computer-readable storage medium of claim 15, wherein the vertical lines are located using an image processing transform.

17. The non-transitory computer-readable storage medium of claim 13, wherein the first points and the second points corresponding to the intersections are located using a corners detection algorithm.

18. The non-transitory computer-readable storage medium of claim 13, wherein each of the first camera and the second camera includes a respective wide-angle lens having a respective field of view of at least one hundred and twenty degrees.

* * * * *